US009538096B2

(12) United States Patent
Dolgin (10) Patent No.: US 9,538,096 B2
(45) Date of Patent: Jan. 3, 2017

(54) IMAGING SYSTEM AND METHODS WITH VARIABLE LATERAL MAGNIFICATION

(71) Applicant: RAYTHEON COMPANY, Waltham, MA (US)

(72) Inventor: Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 172 days.

(21) Appl. No.: 14/164,953

(22) Filed: Jan. 27, 2014

(65) Prior Publication Data

US 2015/0215516 A1    Jul. 30, 2015

(51) Int. Cl.
| | | |
|---|---|---|
| *H04N 5/225* | (2006.01) | |
| *H04N 5/265* | (2006.01) | |
| *H04N 5/232* | (2006.01) | |
| *H04N 5/262* | (2006.01) | |
| *G08B 13/196* | (2006.01) | |
| *G06T 3/00* | (2006.01) | |

(52) U.S. Cl.
CPC ............ *H04N 5/265* (2013.01); *G06T 3/0025* (2013.01); *G08B 13/19628* (2013.01); *G08B 13/19643* (2013.01); *H04N 5/232* (2013.01); *H04N 5/23212* (2013.01); *H04N 5/23293* (2013.01); *H04N 5/23296* (2013.01); *H04N 5/2624* (2013.01); *H04N 5/2628* (2013.01)

(58) Field of Classification Search
CPC ...... H04N 7/81; H04N 5/23212; H04N 5/232; H04N 5/265; G08B 13/19628; G08B 13/19643

USPC ............ 348/47–48, 137, 143, 153, 159, 169
See application file for complete search history.

(56) References Cited

U.S. PATENT DOCUMENTS

| | | | | |
|---|---|---|---|---|
| 3,591,269 | A | * | 7/1971 | Watson ................... G03B 37/02 352/69 |
| 5,028,799 | A | * | 7/1991 | Chen ....................... G01B 11/24 250/559.23 |
| 6,034,718 | A | * | 3/2000 | Hattori .................... G01M 11/37 348/125 |
| 6,515,285 | B1 | | 2/2003 | Marshall et al. |
| 7,333,270 | B1 | | 2/2008 | Pochapsky et al. |
| 2002/0097497 | A1 | | 7/2002 | Kamo |
| 2004/0184163 | A1 | | 9/2004 | Nishioka et al. |
| 2005/0083350 | A1 | * | 4/2005 | Battles ............... H04N 1/00167 345/660 |

(Continued)

OTHER PUBLICATIONS

"Foveated Imaging"—Wikipedia, the free encyclopedia, <http://en.wikipedia.org/wiki/Foveated_imaging>, accessed via the Internet on Jan. 27, 2014, 4 pages.

*Primary Examiner* — Helen Shibru
(74) *Attorney, Agent, or Firm* — Lando & Anastasi, LLP (57) ABSTRACT

Methods and apparatus for producing images having variable lateral magnification. One example of such a method includes receiving a first image having a first level of magnification and representing a first field of view, simultaneously receiving a second image having a second level of magnification and representing a second field of view, the second level of magnification being higher than the first level of magnification and the second field of view being narrower than the first field of view, and digitally processing the first and second images to produce a composite image having a variable lateral magnification derived from the first and second levels of magnification.

16 Claims, 8 Drawing Sheets

(56) References Cited

U.S. PATENT DOCUMENTS

| | | | |
|---|---|---|---|
| 2007/0282190 A1 | 12/2007 | Dekel et al. | |
| 2008/0055412 A1* | 3/2008 | Tanaka | G08G 1/04 |
| | | | 348/159 |
| 2009/0059038 A1* | 3/2009 | Seakins | G09B 21/001 |
| | | | 348/240.99 |
| 2010/0026785 A1* | 2/2010 | Soto-Thompson | A61B 1/042 |
| | | | 348/47 |
| 2010/0166334 A1* | 7/2010 | Zhang et al. | G06T 3/00 |
| | | | 382/263 |
| 2010/0235095 A1 | 9/2010 | Smitherman | |
| 2010/0265331 A1* | 10/2010 | Tanaka | G08B 13/19602 |
| | | | 348/159 |
| 2011/0064327 A1 | 3/2011 | Dagher et al. | |
| 2011/0074710 A1* | 3/2011 | Weeldreyer | G06F 3/0481 |
| | | | 345/173 |
| 2012/0242826 A1 | 9/2012 | Holmes | |
| 2012/0287264 A1* | 11/2012 | Hong | G01N 21/9501 |
| | | | 348/126 |
| 2012/0320193 A1* | 12/2012 | Lienhart | G01C 1/04 |
| | | | 348/135 |
| 2013/0250068 A1* | 9/2013 | Aoki | G06T 7/002 |
| | | | 348/47 |
| 2014/0198185 A1* | 7/2014 | Haugen | G06T 7/0008 |
| | | | 348/48 |
| 2014/0226054 A1* | 8/2014 | Tamura | G03B 13/12 |
| | | | 348/333.08 |
| 2015/0103140 A1 | 4/2015 | Kostuk et al. | |
| 2015/0205083 A1* | 7/2015 | Dolgin | G02B 17/0808 |
| | | | 359/364 |
| 2015/0256768 A1* | 9/2015 | Dolgin | H04N 5/332 |
| | | | 348/164 |

\* cited by examiner

FIG. 5D ure widely used in
both commercial and military applications. Many applications involve long range tracking and aiming, and as a result, require a high level of magnification, or zoom, in the optics. Tracking small objects, such as vehicles or people, from long range, for example, from an unmanned aerial vehicle (UAV) platform, is difficult because the high zoom of the tracking optics required to see the object necessitates a narrow field of view. As a result of the narrow field of view, it is difficult to reacquire the object if it is lost due to terrain, shadows, or other phenomena. Similarly, high-zoom optical scopes or sights, such as those used for aiming a weapon such as a rifle or vehicle-mounted gun, for example, also suffer from poor situational awareness. The user cannot observe things that are even just outside the narrow field of view.

Traditional approaches to addressing these issues have involved the use of variable zoom optics. However, such systems suffer from several disadvantages and are only somewhat effective. For example, there is a time delay associated with changing the zoom, during which time the target object may move outside of the field of view. Also, in certain systems the optics are not focused during the zooming action, and therefore the target object may not be visible during the zoom and may be lost as a result. Additionally, variable zoom optics for certain applications, such as rifle scopes or similar aiming devices, are difficult and expensive to manufacture due to high tolerances. Furthermore, the moving parts associated with most traditional variable zoom optics are common points of failure in the system.

SUMMARY OF INVENTION

Aspects and embodiments are directed to methods and systems capable of providing simultaneous varying degrees of magnification over the field of view of the optics, without requiring moving parts.

According to one embodiment, an imaging system comprises a first camera having a first field of view and a first level of magnification, and configured to produce a first image, a second camera aligned with the first camera and having a second field of view, different from the first field of view, and a second level of magnification, different from the first level of magnification, and configured to produce a second image, a processor coupled to the first and second cameras and configured to digitally process the first and second images to produce a composite image having a variable lateral magnification, and a display coupled to the processor and configured to display the composite image having the variable lateral magnification.

In one example, the second field of view is narrower than the first field of view, and the second level of magnification is higher than the first level of magnification. In another example the second field of view corresponds to a central portion of the first field of view. The processor may be configured to digitally process the first and second images to produce the composite image having high magnification in a center of the composite image, and progressively lower magnification towards a periphery of the composite image. In one example the composite image has the second level of magnification at a center of the composite image and the first level of magnification at a periphery of the composite image.

In one example the first and second cameras are co-bored. In another example each of the first and second cameras includes a photo-sensitive detector, and at least one optical element configured to focus electromagnetic radiation onto the photo-sensitive detector. In one example the processor is configured to digitally adjust levels of the variable lateral magnification. In another example the processor is configured to digitally adjust a distribution of the variable lateral magnification over the image.

According to another embodiment, a method of producing an image having variable lateral magnification comprises receiving a first image having a first level of magnification and representing a first field of view, simultaneously receiving a second image having a second level of magnification and representing a second field of view, the second level of magnification being higher than the first level of magnification and the second field of view being narrower than the first field of view, digitally processing the first and second images to produce a composite image having a variable lateral magnification derived from the first and second levels of magnification, and displaying the composite image on a display.

In one example, digitally processing the first and second images to produce the composite image includes producing the composite image having the second level of magnification at a center of the composite image and the first level of magnification at a periphery of the composite image. In another example digitally processing the first and second images to produce the composite image includes producing the composite image having high magnification in a center of the composite image, and progressively lower magnification towards a periphery of the composite image. The method may further comprise dynamically adjusting a distribution of the variable lateral magnification over the composite image. In another example receiving the first image includes receiving the first image from a first camera having the first field of view, and receiving the second image includes receiving the second image from a second camera aligned with the first camera and having the second field of view.

According to another embodiment, an imaging system comprises a camera system configured to produce multiple images of a scene, the images having different levels of magnification and being registered with one another, a processor coupled to the camera system and configured to receive and process the multiple images to produce a composite image having a variable lateral magnification, and a display coupled to the processor and configured to display the composite image having the variable lateral magnification.

In one example of the imaging system the camera system includes a first camera configured to produce a first image with a first level of magnification, and a second camera aligned with the first camera and configured to produce a second image having a second level of magnification, different from the first level of magnification. The processor is configured to produce the composite image from the first and second images.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to optical systems that are configured to provide different levels of magnification over the field of view of the optics, as discussed in more detail below. With this capability, the system may provide both a relatively wide field of view that facilitates acquiring target objects and preventing the target object from being lost as it moves, and a relatively high zoom in a portion of the field of view that facilitates precise viewing and tracking of the target object. The ability to simultaneously view a wide field of view and have high zoom in a selected region of the field of view (for example, the center) may provide greatly improved situational awareness and significantly ease the task of tracking of small objects at long range.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Unlike the lenses of human eyes, and traditional optical lenses with traditional detectors, which have a relatively constant level of magnification over the entire lens, lenses in the eyes of certain birds of prey (e.g., eagles) and the distribution of the optical receptors have effectively much higher magnification and resolution in the center compared to that at the periphery. Thus, if a target object (e.g., a mouse or other small animal in the case of an eagle) is in the center of the field of view, the bird is able to see the animal with a large amount of detail (enabling the bird to hunt the animal), whereas at the periphery of the field of view the bird is barely able to see the animal. This adaption addresses the issues discussed above, namely that tracking a small, and particularly fast moving object, through a field of view similar to a narrow angle camera is extremely difficult. With the variable magnification in the bird's eyes, although the area of high resolution is reduced, the bird is nonetheless still able to see and track the animal when it moves slightly out of the center of the field of view.

Aspects and embodiments are directed to optical systems that are configured to provide similar capability. In particular, according to certain embodiments, a tracking display, which may be coupled to an optical imaging system and configured to display the scene viewed through the field of view of the optical imaging system, is provided that has a variable magnification over its surface. As a result, certain portion of the image may be viewed with high resolution, while still maintaining the ability to also (and simultaneously) view a wider field of view with lower resolution. As used herein, the term "variable lateral magnification" is intended to refer to such an arrangement, where the magnification is variable over the surface of the display or field of view of the optical system. A image having variable lateral magnification as different levels of magnification and resolution over the plane or surface of the image (e.g., from the periphery to the center, for example). In one embodiment, the tracking display may have higher magnification at and near its center, and lower magnification at the periphery; however, other configurations and distributions of the magnification level(s) over the display may be implemented, as discussed further below. In one example, such a tracking display may be used by the operator of a UAV, for example, although the tracking display may be used in numerous other applications.

Figure 1:
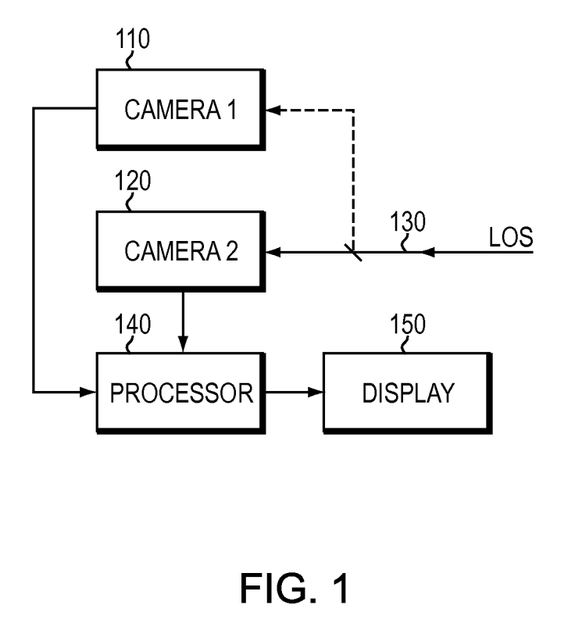
FIG. 1 is a block diagram of one example of a system configured to provide a display having variable lateral magnification according to aspects of the invention.

Referring to FIG. 1, there is illustrated a block diagram of one example of a system configured to provide a display with variable lateral magnification (and therefore variable lateral resolution). According to one embodiment, the system includes two co-bored or aligned cameras 110, 120. A first camera 110 may be a wide angle camera (i.e., have a relatively wide field of view), and a second camera 120 may be a narrow angle camera (i.e., have a relatively narrow field of view). Either or both of the cameras 110, 120 may have optical zoom. Each of the cameras 110, 120 may include a photo-sensitive detector and associated read-out circuitry, such as a focal plane array or other imaging sensor, and one or more optical elements (such as lenses and/or mirrors) configured to receive and focus incoming electromagnetic radiation 130 onto the photo-sensitive detector. The cameras 110, 120 are coupled to a processor 140 configured to generate an image from the signals provided by the cameras, as discussed further below. The processor 140 is coupled to a display 150 configured to display the image generated by the processor for viewing by a human operator, for example. The processor 140 may be part of the display 150, or may be a separate component. Although the exemplary system shown in FIG. 1 includes two aligned cameras 110, 120, it will be appreciated by those skilled in the art, given the benefit of this disclosure, that embodiments of the system are not limited to using two cameras. In other implementations, a single camera system with multiple fields of view and/or zoom options and configured to produce multiple registered images of a scene with different levels of magnification, or more than two aligned cameras may be used, and the processor 140 may be configured to process images from the one or more cameras. Thus, the example discussed herein using two cameras is intended for illustration and explanation only, and is not intended to be limiting.

According to one embodiment, the processor 140 is configured to synthesize a variable zoom image in real time by processing the signals from the two aligned cameras 110, 120. The processor 140 may use any of several well known image processing techniques to combine the signals from the two cameras 110, 120 to produce a composite image. In one example, the cameras 110, 120 are co-bored (i.e., have a common line of sight), such that fields of view of the two cameras spatially overlap, and the image signals from each camera can be processed using this information. In another example, the two cameras are aligned with a known offset, such that the processor can use the known alignment information to process the two image signals and produce the composite image. In the block diagram example illustrated in FIG. 1, a beamsplitter 160, or other optical beam-directing device, may be used to achieve alignment or a co-bored arrangement of the two cameras 110, 120; however, the cameras may be aligned and optionally configured to share a common optical path using any of numerous well known techniques and components. Furthermore, as discussed above, although the example illustrated in FIG. 1 includes two cameras 110, 120, in other examples, a single camera or more than two cameras may be used, and the processor 140 may be configured to process the image data from these one or more cameras.

As discussed above, in one embodiment, the first camera 110 is a wide angle camera, and therefore provides a first image that covers a relatively wide field of view. The second camera 120 may be a narrow angle camera, and may have optical zoom associated with it. The second camera may therefore provide a second image that covers a smaller field of view than the first image, but is of relatively high magnification/resolution. The first camera 110 may or may not have optical zoom associated with it; however, generally the first image provided by the first camera may have lower magnification/resolution than the second image. The processor 140 processes the first and second images, using the known alignment relationship between the first and second cameras 110, 120, to produce the composite image having regions with different levels of magnification, corresponding to the different levels of zoom of the two cameras as well as optional additional digital zoom, for display on the display 150. As discussed above, in one example, the image produced by the second, narrow angle camera 120, corresponds to a central portion of the wider field of view of the first, wide angle camera 110. Accordingly, in this example, the composite image has higher resolution in the center, and lower resolution at the periphery. Furthermore, digital image processing may be performed by the processor 140 to "smooth" the magnification variation, thereby creating a composite image having a gradient magnification across the image, rather than a "step" transition between the magnification region and the lower magnification region. In one example, the processor is configured to produce the composite image having a high magnification in the center (corresponding to the magnification of the narrow angle camera, optionally enhanced with additional digital zoom), to low magnification at the periphery (corresponding to the magnification of the wide angle camera). In certain examples, the processor is configured to dynamically adjust the lateral magnification of the displayed image. For example, the image may be displayed with uniform low magnification (e.g., corresponding to the magnification of the wide angle camera) over the whole display, or high magnification in the center and progressively lower magnification towards the periphery, or high magnification over the whole display, with these options being dynamically configurable by the processor 140.

According to certain embodiments, the processor may use any of various techniques to build the composite image in which the image resolution is significantly higher in the center than at the periphery of the image. For example, a "square" or "rectangular" processing technique may be used to build the composite image, in which the magnification is adjusted according to a rectangular grid overlaying the image area. In other examples, the processor may use a "circular" processing technique in which the magnification is adjusted according to concentric rings overlaying the image area. In other examples, an elliptical distribution of zoom may be used. In at least some circumstances, any of these techniques using various distributions of zoom may produce certain amounts of image distortion. However, an operator may select a processing technique based, at least in part, on the distortion produced and the ability of the operator or tracking software algorithms to accommodate the distortion, and/or additional digital post-processing may be used to reduce or even eliminate any resulting image distortion.

Differences between a composite image produced using the variable lateral magnification techniques discussed above, and a conventional zoomed image (uniform lateral magnification) are demonstrated with reference to FIGS. 2, 3A-C, 4A-C, and 5A-D and discussed further below.

Figure 2:
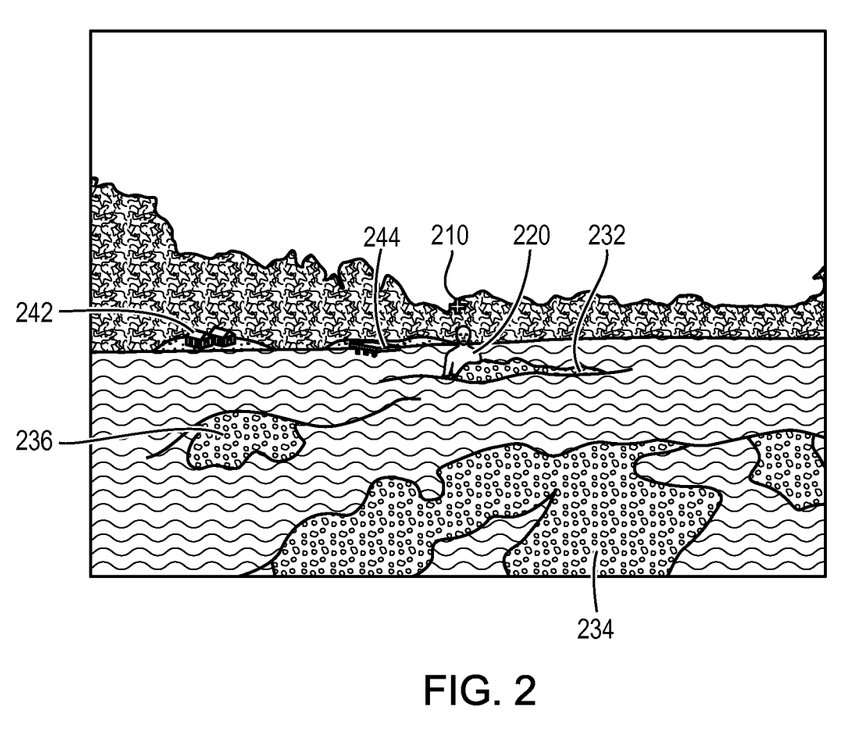
FIG. 2 is a representation of an image of a scene.

FIG. 2 is a representation of a "base-line" image taken with a wide angle camera. Marker 210 represents the center of the base-line image, and the "aim point" for a targeting or tracking application. The image of FIG. 2 includes a target 220 (i.e., the target desired to be tracked), features 232, 234, and 236, and objects 242 and 244.

Figure 3A:
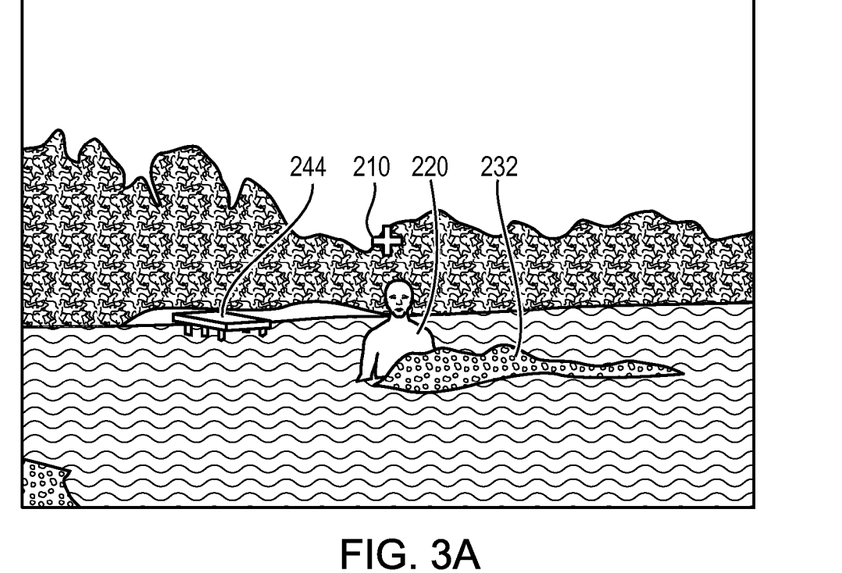
FIGS. 3A-C are representations of magnified versions of the image of FIG. 2 using different levels of conventional uniform magnification.
Figure 3B:
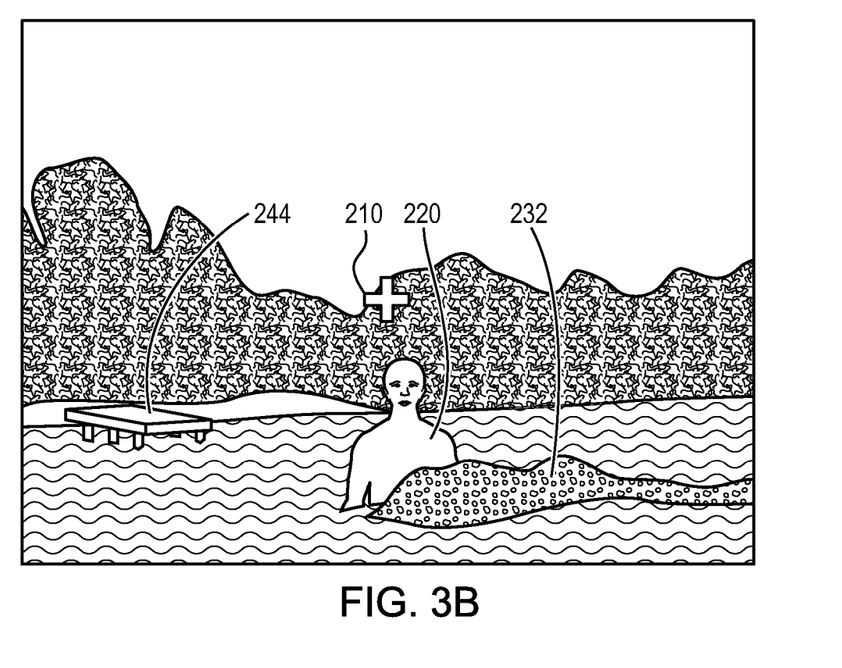
Figure 3C:
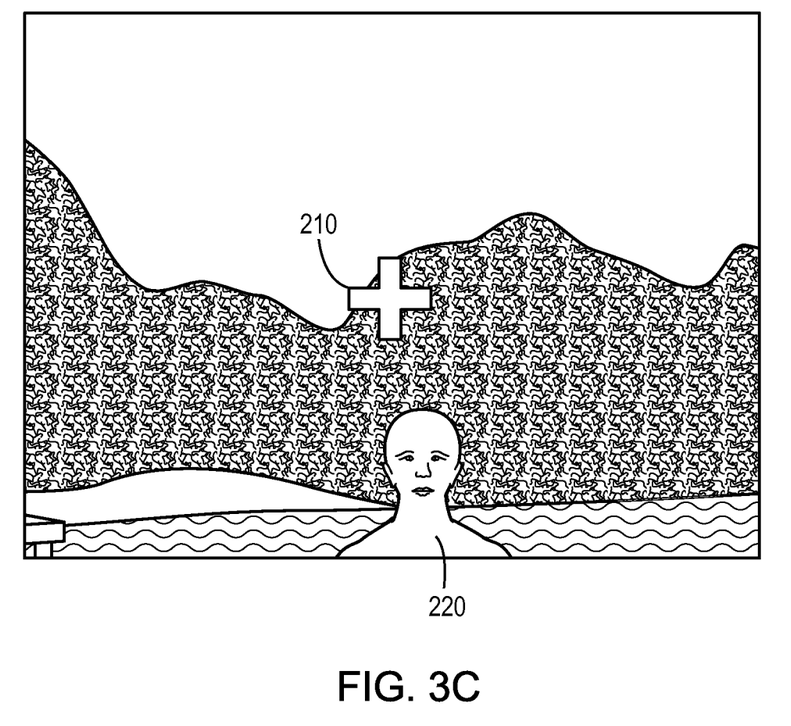

FIGS. 3A-C are representations of "zoomed" versions of the image of FIG. 2 produced using a representative version of a processing algorithm according to one embodiment. FIG. 3A is a representation of the image with a 2.65× zoom. FIG. 3B is a representation of the image with a 5.1× zoom. FIG. 3C is a representation of the image with a 9.9× zoom; the zoom value refers to the resolution of the image near the aiming point (marker 210). The marker 210 is in the same position in each image. As may be seen with reference to FIGS. 2 and 3A-C, as the magnification (or zoom level) increases, the field of view captured in the image decreases, and significant peripheral vision is lost. In addition, at very high conventional magnification (FIG. 3C), only a portion of the target 220 remains in the image, and almost all contextual information is lost.

Figure 4A:
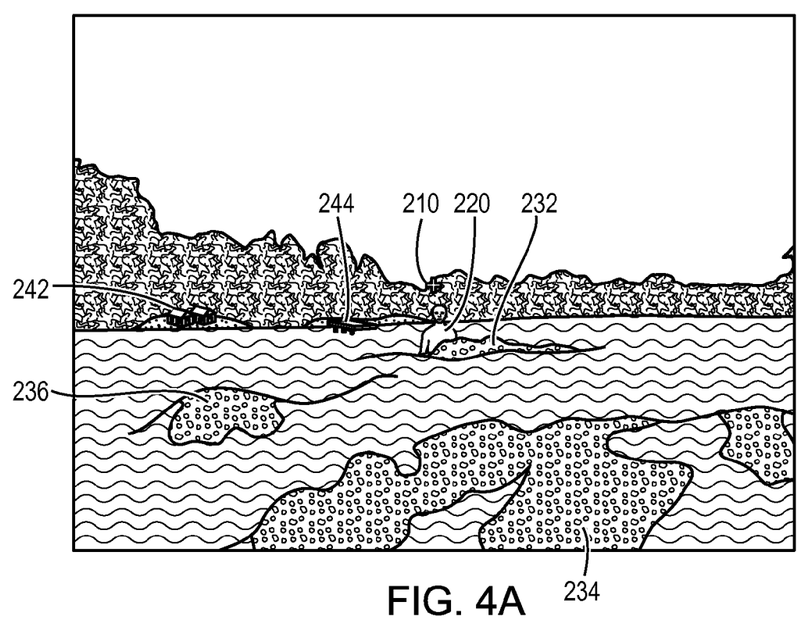
FIGS. 4A-C are representations of magnified versions of the image of FIG. 2 using different levels of variable lateral magnification according to aspects of the invention.
Figure 4B:
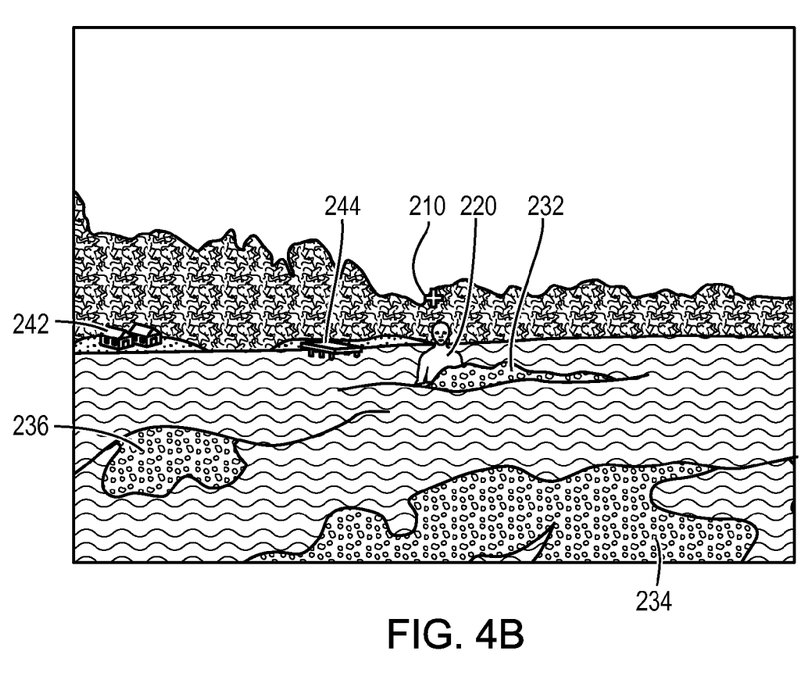
Figure 4C:
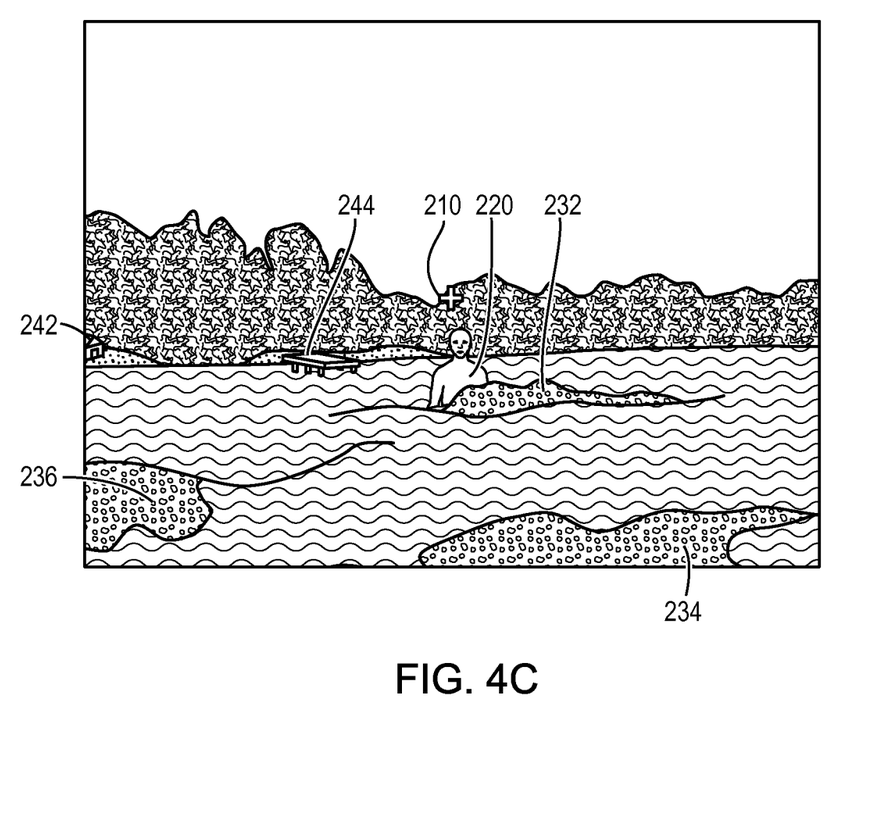
Figure 5A:
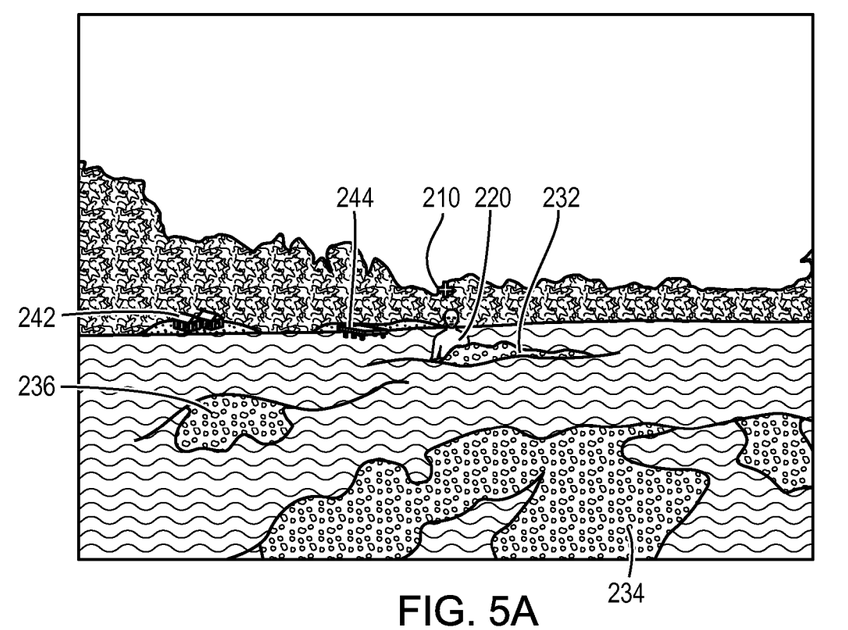
FIGS. 5A-D are further representations of magnified versions of the image of FIG. 2 using different levels of variable lateral magnification according to aspects of the invention.
Figure 5B:
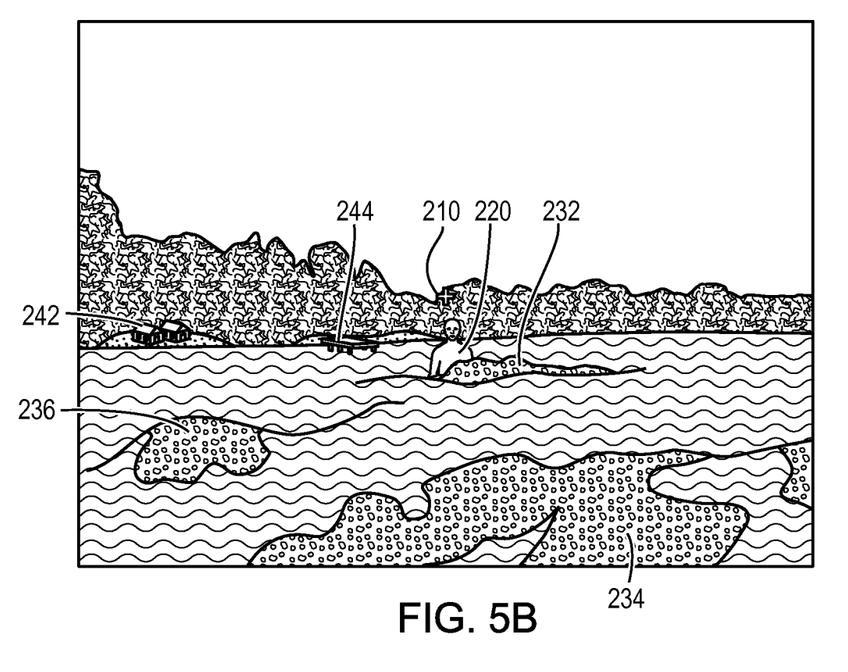
Figure 5C:
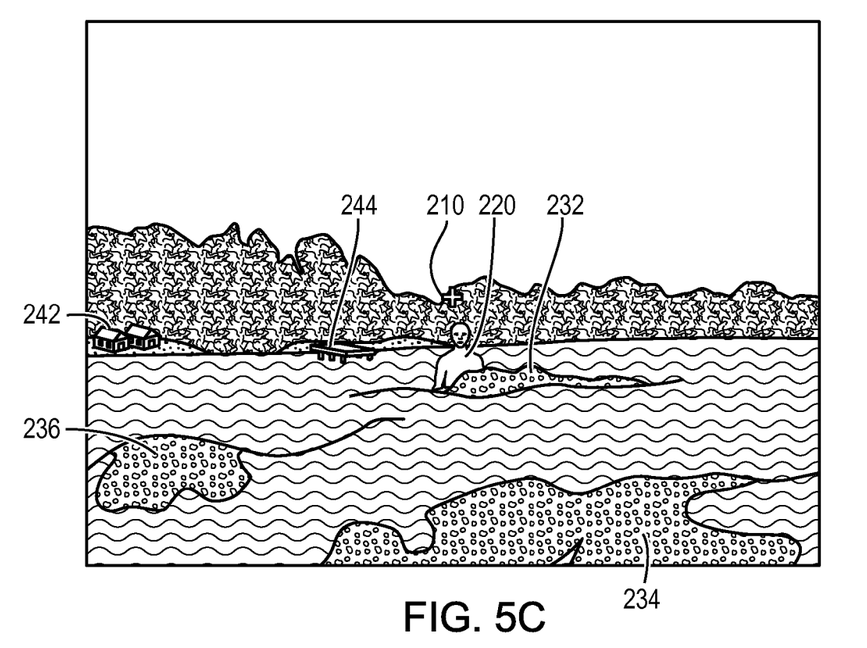
Figure 5D:
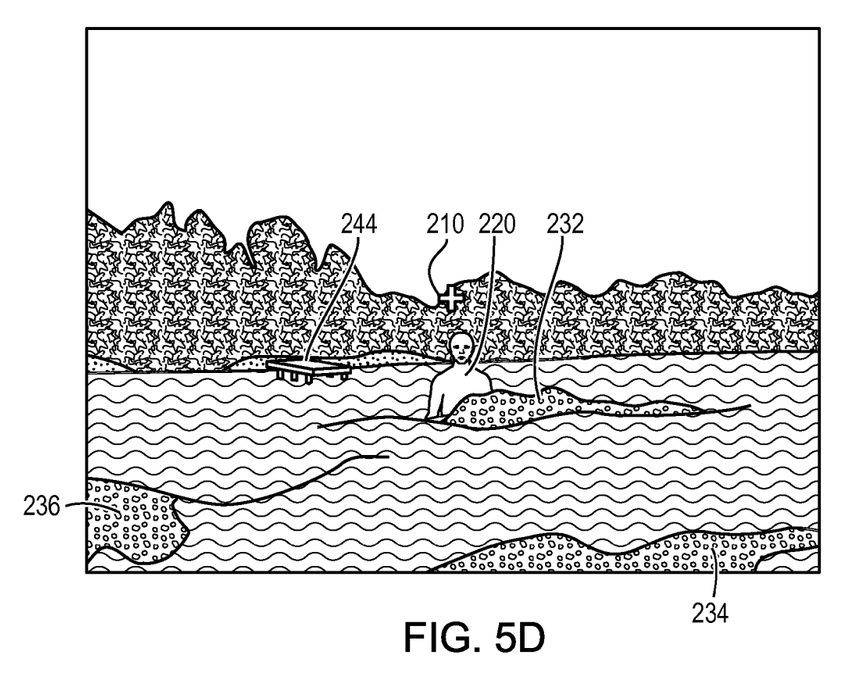

FIGS. 4A-C are representations of "zoomed" versions of the image of FIG. 2 using a display 150 with variable lateral magnification as discussed above. The representations of FIGS. 4A-C correspond to zoomed images that would be obtained using a square variable lateral magnification processing technique. FIG. 4A is a representation of the image having a vertical compression (top to bottom) of 4× and a horizontal compression (left to right) of 5× relative to the baseline image of FIG. 2. The representation shown in FIG. 4A corresponds roughly to the zoom level of FIG. 3A. FIG. 4B is a representation of the image having a vertical compression of 11× and a horizontal compression of 14× relative to the baseline image of FIG. 2. The representation shown in FIG. 4B corresponds roughly to the zoom level of FIG. 3B. FIG. 4C is a representation of the image having a vertical compression of 30× and a horizontal compression of 38× relative to the baseline image of FIG. 2. The representation shown in FIG. 4C corresponds roughly to the zoom level of FIG. 3C.

Comparing FIGS. 3A and 4A, it may be seen that that the target 220 is close to the same size (same resolution and magnification) in both images; however, the image produced using variable lateral magnification retains coverage of a far larger field of view, thereby providing better contextual information and situational awareness. Similarly, comparing FIG. 4B with FIG. 3B, and FIG. 4C with FIG. 3C, demonstrates that, using variable lateral magnification, the target 220 is both magnified and remains more centrally positioned in the image without requiring the center point (or aiming point) represented by marker 210 to be moved. Thus, whereas the target 220 may be easily lost when using a conventional high zoom camera (producing images such as that represented in FIG. 3C), using a display having variable lateral magnification according to embodiments of the present invention it may be significantly easier to keep with the target within the field of view. From FIGS. 4A-C it may be seen that the variable lateral magnification technique produces an image that has a large amount of detail associated with a central portion of the image, and therefore the target 220, and yet retains the contextual information surrounding the target since the overall field of view covered by the image remains very similar to that of the original image of FIG. 2. Thus, the images produced using variable lateral magnification may facilitate accurate aiming at the target 220, while also maintaining a relatively wide field of view, making tracking of the target as it moves much easier. Additionally, the number of pixels used to produce the images with variable lateral magnification may be significantly smaller than the number of pixels required to produce a high resolution image using a conventional narrow angle camera. This feature may provide significant cost and data processing (bandwidth) savings.

FIGS. 5A-D are representations of zoomed versions of the image represented in FIG. 2 using an example of circular variable lateral magnification. FIGS. 5A-D further demonstrate that using a two-camera system and digital processing to build a composite image with variable lateral magnification produces an image in which the target may be represented with high magnification (allowing for precision aiming, for example), while retaining almost the same peripheral information as is present in the corresponding low zoom, wide angle image. Additionally, as discussed above, the number of pixels used to produce the composite image may be significantly reduced relative to the number of pixels used to produce a corresponding conventional high-resolution image. For example, if the image represented in FIG. 2 is produced using 1380×1968 pixels, for example, the image represented in FIG. 5A may be produced using 596×712 pixels; the image represented in FIG. 5B may be produced using 324×368 pixels; the image represented in FIG. 5C may be produced using 272×304 pixels; and the image represented in FIG. 5D may be produced using 168×188 pixels. Thus, the same or similar targeting information (resolution on target 220) and peripheral information may be captured using nearly 10 times fewer pixels.

A concept that is similar to variable lateral magnification in some respects, although vastly different in others, is foveated imaging, which is a digital image processing technique in which the image resolution, or amount of detail, varies across the image according to one or more "fixation points." A fixation point indicates the highest resolution region of the image and corresponds to the center of the eye's retina, the fovea. The location of a fixation point may be specified, either manually or by a computer algorithm, using a pointing device, such as a computer mouse, for example, or using an eye-tracking mechanism that monitors the position of the eye. A foveated image maintains a large field of view, and has high resolution at the fixation points in the image, but has a blurred periphery and no magnification (or uniform magnification over the whole image). By contrast, an image with variable lateral magnification according to embodiments discussed above has high magnification over a portion of the image (e.g., the central region) and lower magnification elsewhere, while also maintaining a large field of view. Furthermore, unlike a foveated image, providing a display with variable lateral magnification may significantly improve a human operator's ability to track and aim at a moving target, as discussed above.

Thus, aspects and embodiments may provide optical imaging systems capable of providing and displaying an image with variable lateral magnification over the field of view, which allows for a greatly improved ability to track a target. As discussed above, the magnification level as well as the distribution of the magnification over the field of view may be dynamically varied, further providing for enhanced tracking and/or targeting capabilities.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system comprising:
   a first camera having a first field of view and a first level of magnification, and configured to produce a first image;
   a second camera aligned with the first camera and having a second field of view, different from the first field of view, and a second level of magnification, different from the first level of magnification, and configured to produce a second image;
   a processor coupled to the first and second cameras and configured to digitally process the first and second images to produce a composite image having a variable lateral magnification, wherein the variable lateral magnification includes a gradient magnification across the composite image and between the first level of magnification and the second level of magnification; and
   a display coupled to the processor and configured to display the composite image having the variable lateral magnification.

2. The imaging system of claim 1, wherein the second field of view is narrower than the first field of view, and the second level of magnification is higher than the first level of magnification.

3. The imaging system of claim 2, wherein the second field of view corresponds to a central portion of the first field of view.

4. The imaging system of claim 3, wherein the processor is configured to digitally process the first and second images to produce the composite image having high magnification in a center of the composite image, and progressively lower magnification towards a periphery of the composite image.

5. The imaging system of claim 3, wherein the composite image has the second level of magnification at a center of the composite image and the first level of magnification at a periphery of the composite image.

6. The imaging system of claim 1, wherein the first and second cameras are co-bored.

7. The imaging system of claim 1, wherein each of the first and second cameras includes:
a photo-sensitive detector; and
at least one optical element configured to focus electromagnetic radiation onto the photo-sensitive detector.

8. The imaging system of claim 1, wherein the processor is configured to digitally adjust levels of the variable lateral magnification.

9. The imaging system of claim 1, wherein the processor is configured to digitally adjust a distribution of the variable lateral magnification over the image.

10. A method of producing an image having variable lateral magnification comprising:
receiving a first image having a first level of magnification and representing a first field of view;
simultaneously receiving a second image having a second level of magnification and representing a second field of view, the second level of magnification being higher than the first level of magnification and the second field of view being narrower than the first field of view;
digitally processing the first and second images to produce a composite image having a variable lateral magnification derived from the first and second levels of magnification, wherein the variable lateral magnification includes a gradient magnification across the composite image and between the first level of magnification and the second level of magnification; and
displaying the composite image on a display.

11. The method of claim 10, wherein digitally processing the first and second images to produce the composite image includes producing the composite image having the second level of magnification at a center of the composite image and the first level of magnification at a periphery of the composite image.

12. The method of claim 10, wherein digitally processing the first and second images to produce the composite image includes producing the composite image having high magnification in a center of the composite image, and progressively lower magnification towards a periphery of the composite image.

13. The method of claim 10, further comprising dynamically adjusting a distribution of the variable lateral magnification over the composite image.

14. The method of claim 10, wherein receiving the first image includes receiving the first image from a first camera having the first field of view; and wherein
receiving the second image includes receiving the second image from a second camera aligned with the first camera and having the second field of view.

15. An imaging system comprising:
a camera system configured to produce multiple images of a scene, the images having different levels of magnification and being registered with one another;
a processor coupled to the camera system and configured to receive and process the multiple images to produce a composite image having a variable lateral magnification, wherein the variable lateral magnification includes a gradient magnification across the composite image and between a first level of magnification and a second level of magnification; and
a display coupled to the processor and configured to display the composite image having the variable lateral magnification.

16. The imaging system of claim 15, wherein the camera system includes:
first camera configured to produce a first image with the first level of magnification; and
a second camera aligned with the first camera and configured to produce a second image having the second level of magnification, different from the first level of magnification;
wherein the processor is configured to produce the composite image from the first and second images.

* * * * *